US010652657B2

(12) United States Patent
Suyama et al.

(10) Patent No.: US 10,652,657 B2
(45) Date of Patent: May 12, 2020

(54) SYSTEM, TERMINAL APPARATUS, MAIN APPARATUS, AND METHOD

(71) Applicant: Yamaha Corporation, Hamamatsu-shi, Shizuoka (JP)

(72) Inventors: Akihiko Suyama, Hamamatsu (JP); Masahiro Ishida, Iwata (JP); Tomoyoshi Akutagawa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/825,508

(22) Filed: Nov. 29, 2017

(65) Prior Publication Data

US 2018/0115826 A1 Apr. 26, 2018

Related U.S. Application Data

(63) Continuation of application No. PCT/JP2016/073877, filed on Aug. 16, 2016.

(30) Foreign Application Priority Data

Aug. 19, 2015 (JP) ................................. 2015-162333

(51) Int. Cl.
*H04R 3/12* (2006.01)
*H04R 1/06* (2006.01)
(Continued)

(52) U.S. Cl.
CPC ............... *H04R 3/12* (2013.01); *G06F 3/165* (2013.01); *H04L 5/14* (2013.01);
(Continued)

(58) Field of Classification Search
CPC ..... G06F 3/165; H04L 5/14; H04N 21/43637; H04R 2420/07; H04R 3/12; H04R 1/06;
(Continued)

(56) References Cited

U.S. PATENT DOCUMENTS 8,024,487 B2   9/2011 Bhanu et al.
8,793,127 B2 * 7/2014 Printz ................... G06Q 30/02
                                                       704/232
(Continued)

FOREIGN PATENT DOCUMENTS

JP      2008-35400 A    2/2008
JP      2015-18384 A    1/2015
(Continued)

OTHER PUBLICATIONS

International Search Report (PCT/ISA/210) issued in PCT Application No. PCT/JP2016/073877 dated Nov. 8, 2016 with English translation (Three (3) pages).
(Continued)

*Primary Examiner* — Paul Kim
*Assistant Examiner* — Friedrich Fahnert
(74) *Attorney, Agent, or Firm* — Crowell & Moring LLP

(57) ABSTRACT

Provided is a system including: a sink device related information acquisition unit configured to acquire sink device related information, which is information on sink device capable of receiving a signal transmitted from a transmission unit of a main apparatus in response to an operation of switching the transmission unit of the main apparatus on, the sink device related information being acquired before the operation of switching the transmission unit on; a first display control unit configured to display, when information on sink device is contained in the sink device related information, the information on sink device on a display unit based on the sink device related information; and a second display control unit configured to cause, when information on sink device is not contained in the sink device related information, the main apparatus to try to detect sink device, and to display information on sink device on the display unit based on a result of the detection.

7 Claims, 7 Drawing Sheets

(51) Int. Cl.
*H04Q 9/00* (2006.01)
*H04W 4/80* (2018.01)
*H04L 5/14* (2006.01)
*G06F 3/16* (2006.01)
*H04N 21/4363* (2011.01)
*H04W 8/00* (2009.01)

(52) U.S. Cl.
CPC ......... *H04N 21/43637* (2013.01); *H04Q 9/00* (2013.01); *H04R 1/06* (2013.01); *H04W 4/80* (2018.02); *H04R 2420/07* (2013.01); *H04W 8/005* (2013.01)

(58) Field of Classification Search
CPC .......... H04Q 9/00; H04W 4/80; H04W 8/005; H04W 76/15; H04W 88/10; H04M 1/6091; H04M 2250/02
USPC ...................... 381/79, 80; 455/41.2; 370/338
See application file for complete search history.

(56) References Cited

U.S. PATENT DOCUMENTS

| | | | | |
|---|---|---|---|---|
| 2009/0169030 | A1* | 7/2009 | Inohara | H04R 5/04 381/80 |
| 2010/0284389 | A1* | 11/2010 | Ramsay | G06F 17/30017 370/338 |
| 2012/0099594 | A1 | 4/2012 | Lau et al. | |
| 2013/0316649 | A1* | 11/2013 | Newham | H04W 88/04 455/41.2 |
| 2014/0119561 | A1* | 5/2014 | Banks | H04R 3/12 381/80 |
| 2015/0326331 | A1* | 11/2015 | Knowles | H04R 27/00 370/350 |
| 2016/0072678 | A1* | 3/2016 | Dong | H04W 4/70 370/254 |
| 2016/0253145 | A1* | 9/2016 | Lee | G06F 3/04883 381/79 |
| 2017/0099546 | A1* | 4/2017 | Spitznagle | G06F 3/0481 |
| 2018/0020400 | A1* | 1/2018 | Young | H04W 48/18 |
| 2018/0027368 | A1* | 1/2018 | Girardier | H04N 21/4307 455/41.2 |

FOREIGN PATENT DOCUMENTS

| | | |
|---|---|---|
| JP | 2015-53550 A | 3/2015 |
| WO | WO 2014/186733 A1 | 11/2014 |

OTHER PUBLICATIONS

Japanese-language Written Opinion (PCT/ISA/237) issued in PCT Application No. PCT/JP2016/073877 dated Nov. 8, 2016 (Three (3) pages).
UpDown-G, Bluetooth de Tsushin o Okonau (2), techbooster.jpn. org, May 13, 2011, retrieved on Oct. 27, 2016 from URL: http://web.archive.org/web/20171127170613/https://techbooster.org/android/device/5535/ (Eight (8) pages).
International Preliminary Report on Patentability (PCT/IB/338 & PCT/IB/373) issued in PCT Application No. PCT/JP2016/073877 dated Mar. 1, 2018, including English translation of document C2 (Japanese-language Written Opinion (PCT/ISA/327 previously filed on Nov. 29, 2017)) (seven (7) pages).
Extended European Search Report issued in counterpart European Application No. 16837102.9 dated Aug. 30, 2018 (nine (9) pages).
European Office Action issued in counterpart European Application No. 16837102.9 dated May 3, 2019 (seven (7) pages).
European Office Action issued in counterpart European Application No. 16837102.9 dated Nov. 18, 2019 (seven (7) pages).

* cited by examiner

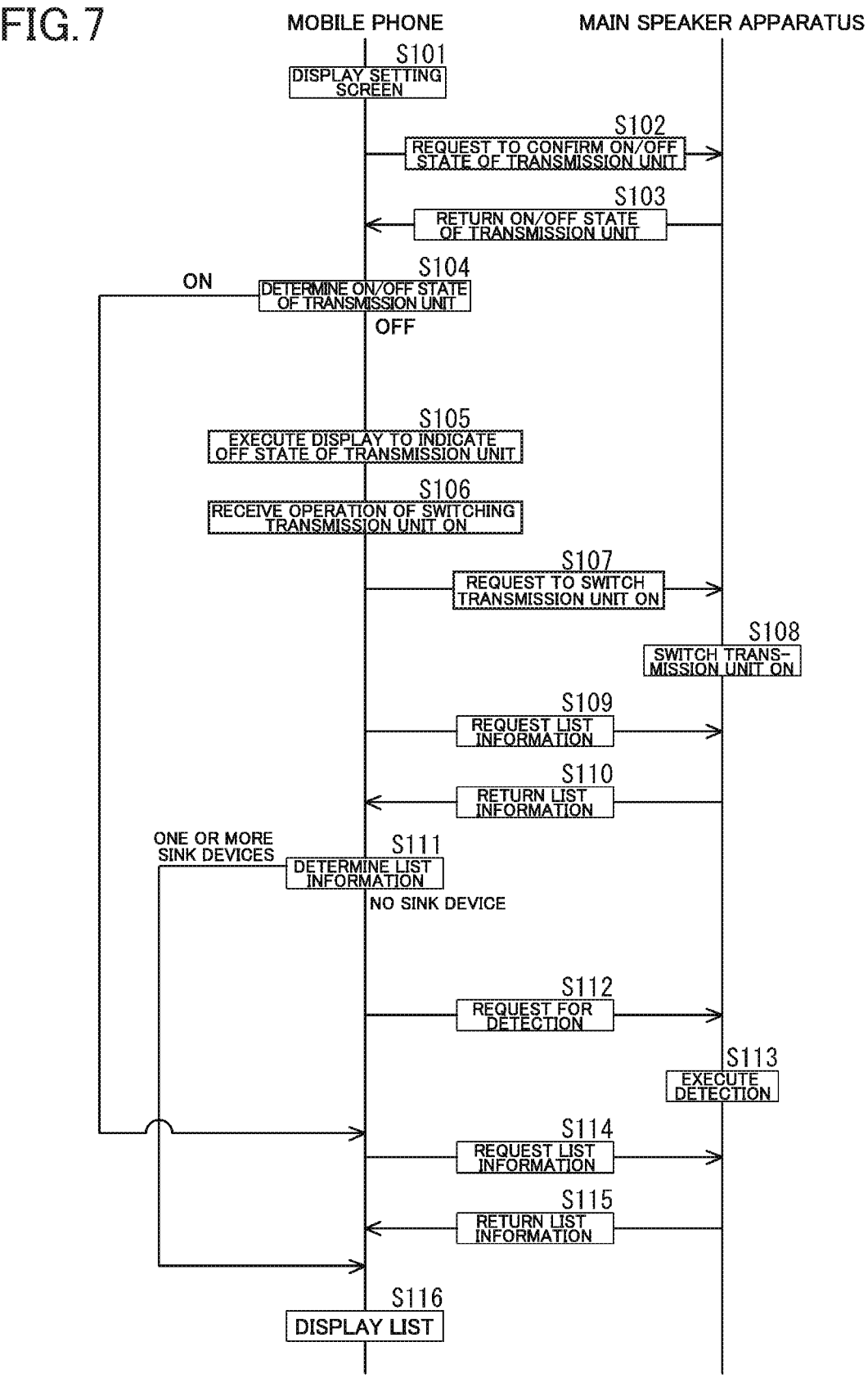

SYSTEM, TERMINAL APPARATUS, MAIN APPARATUS, AND METHOD

CROSS-REFERENCE TO RELATED APPLICATION

This application is a continuation of PCT International Application No. PCT/JP2016/073877, filed Aug. 16, 2016, which claims priority under 35 U.S.C. § 119 from Japanese Patent Application No. JP 2015-162333, filed Aug. 19, 2015, the entire disclosure of which are herein expressly incorporated by reference in its entirety.

BACKGROUND OF THE INVENTION

1. Field of the Invention

The present invention relates to a system, a terminal apparatus, a main apparatus, and a method.

2. Description of the Related Art

Hitherto, various kinds of wireless communication standards, for example, Bluetooth (trademark), have been developed. Besides, there is known an audio device including a plurality of signal input units each configured to receive an audio signal in order to enable reception of audio signals from a plurality of input source devices including an input source device configured to transmit an audio signal in a wireless manner. For example, in Japanese Patent Application Laid-open No. 2015-053550, there is disclosed a speaker apparatus including a signal input unit that supports Bluetooth and LINE input.

Meanwhile, communication via Bluetooth is based on a device having a function (Bluetooth sink) of receiving a signal and a function (Bluetooth source) of transmitting a signal. The device having the function of transmitting a signal and the device having the function of receiving a signal establish communication (pairing), to thereby enable transmission of an audio signal.

When one audio device has both of the reception function and the transmission function of Bluetooth, Bluetooth can be used to perform both transmission and reception of an audio signal. However, the reception function and transmission function of Bluetooth cannot be operated at the same time. Thus, when the audio device has the functions of receiving and transmitting an audio signal, the reception function and the transmission function need to be switched.

When the reception function of an audio device is set off and the transmission function thereof is switched on, the audio device tries to detect other audio devices (hereinafter referred to as "sink device") capable of receiving audio signals. When a user specifies any one of the detected sink devices, the audio device establishes communication to/from the specified sink device.

When there are a plurality of sink devices capable of receiving audio signals, the detection may take, for example, about 10 seconds. Assuming that the audio device tries to detect sink devices every time the user switches the communication destination from a sink device (first sink device) that maintains currently established communication to a different sink device (second sink device), every switch of the sink device causes detection time, and may result in a failure to rapidly select a sink device.

The present invention has an object to provide a control terminal, an audio system, and an audio device control program, which are capable of, for example, rapidly selecting a sink device that establishes communication to/from an audio device.

According to one embodiment of the present invention, there is provided a system including: a sink device related information acquisition unit configured to acquire sink device related information, which is information on sink device capable of receiving a signal transmitted from a transmission unit of a main apparatus in response to an operation of switching the transmission unit of the main apparatus on, the sink device related information being acquired before the operation of switching the transmission unit on; a first display control unit configured to display, when information on sink device is contained in the sink device related information, the information on sink device on a display unit based on the sink device related information; and a second display control unit configured to cause, when information on sink device is not contained in the sink device related information, the main apparatus to try to detect sink device, and to display information on sink device on the display unit based on a result of the detection.

According to one embodiment of the present invention, there is provided a terminal apparatus including: an operation unit configured to receive an operation of switching a transmission unit of a main apparatus on/off; a sink device related information acquisition unit configured to acquire, when the operation unit has received an operation of switching the transmission unit on, sink device related information on sink device capable of receiving a signal transmitted from the transmission unit of the main apparatus; and a control unit configured to display, when information on sink device is contained in the sink device related information, the information on sink device on a display unit based on the sink device related information, and to transmit, when information on sink device is not contained in the sink device related information, a command for causing the main apparatus to try to detect sink device.

According to one embodiment of the present invention, there is provided a main apparatus including: a reception unit configured to receive the request to switch the transmission unit on; the transmission unit configured to transmit to a terminal apparatus, when a request to switch the transmission unit on is received by the reception unit, sink device related information, which is information on sink device capable of receiving a signal transmitted from the transmission unit, the sink device related information being acquired before the reception of the request to switch the transmission unit on; and a detection unit configured to detect, when the sink device related information does not contain information on sink device, sink device in response to a command transmitted to the main apparatus.

BRIEF DESCRIPTION OF THE DRAWINGS

FIG. 7 is a diagram for illustrating a procedure of displaying, on a list display part of the mobile phone, sink devices capable of communicating to/from the main speaker apparatus via Bluetooth.

DETAILED DESCRIPTION OF THE INVENTION

Figure 1:
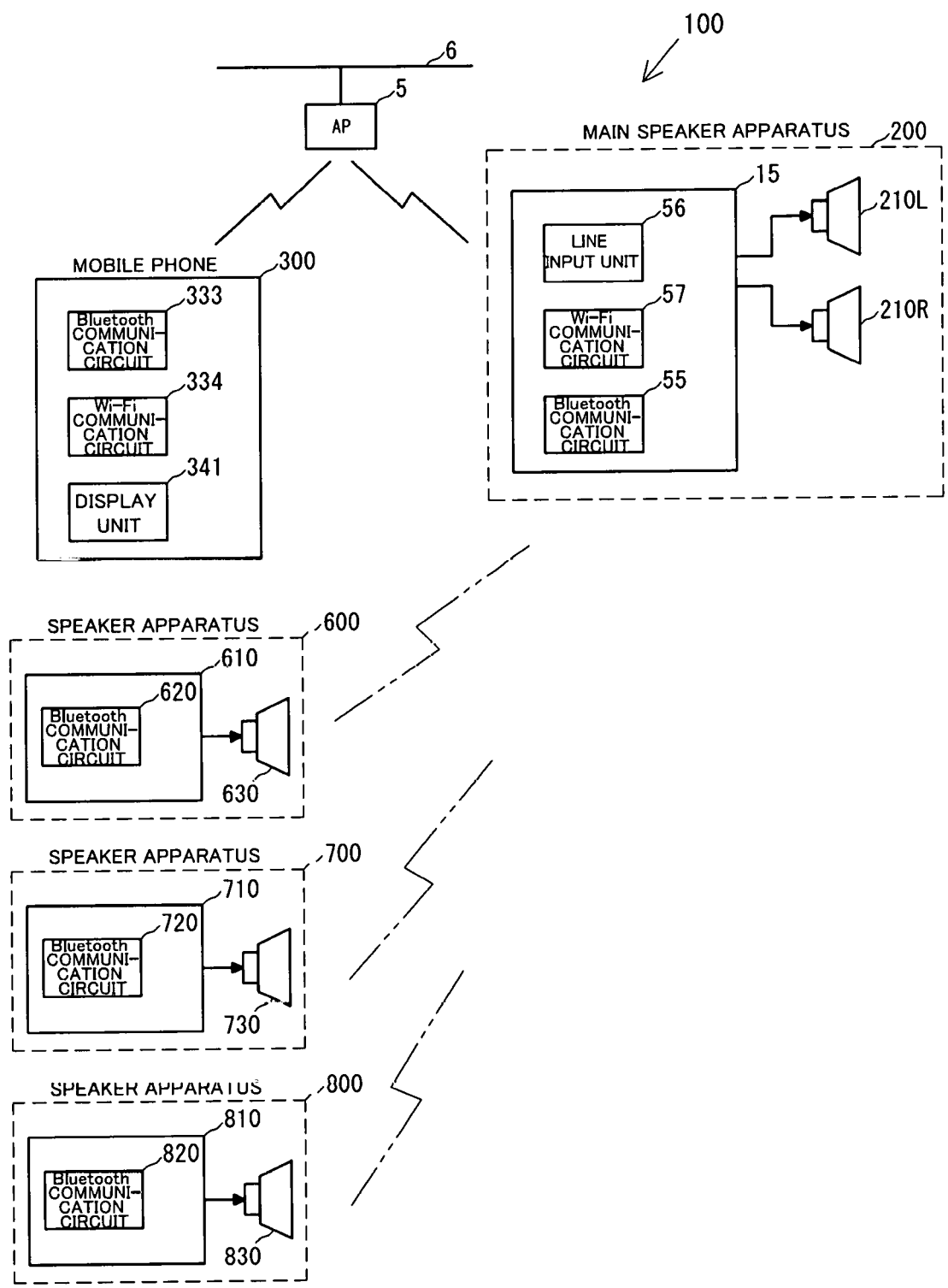
FIG. 1 is a diagram for illustrating each component device of an audio system.

Now, a description is given of an audio system 100 according to an embodiment of the present invention with reference to the drawings. FIG. 1 is a diagram for illustrating each component device of the audio system 100. The audio system 100 includes a main speaker apparatus 200 and a multifunctional mobile phone 300 (namely, smartphone, and hereinafter simply referred to as "mobile phone"). The main speaker apparatus 200 corresponds to an audio device of the present invention, and the mobile phone 300 corresponds to a control terminal of the present invention. Speaker apparatus 600, 700, and 800 are capable of receiving audio signals transmitted from the main speaker apparatus 200 via Bluetooth. The speaker apparatus 600, 700, and 800 correspond to sink devices of the present invention.

The main speaker apparatus 200 includes, for example, an electronic circuit 15, a Bluetooth communication circuit 55, a LINE input unit 56, a Wi-Fi communication circuit 57, and speaker units 210L and 210R. The main speaker apparatus 200 has functions of transmitting/receiving an audio signal via wireless communication based on the Bluetooth (hereinafter also referred to as "BT") standard. The main speaker apparatus 200 can set the reception function off and the transmission function on to transmit an audio signal to a sink device (e.g., one out of speaker apparatus 600, 700, and 800). The main speaker apparatus 200 is connected to a network 6 via a wireless access point 5 using the Wi-Fi communication circuit 57.

The mobile phone 300 includes, for example, a Bluetooth communication circuit 333, a Wi-Fi communication circuit 334, and a display unit 341. The mobile phone 300 has a function of performing remote control (remote control function) of the main speaker apparatus 200. The user can use the mobile phone 300 to switch on/off of the transmission function and the reception function of the main speaker apparatus 200, or to select a transmission destination to which an audio signal is transmitted from the main speaker apparatus 200. The mobile phone 300 is connected to the network 6 via the wireless access point 5 using the Wi-Fi communication circuit 334.

The speaker apparatus 600, 700, and 800 include, for example, electronic circuits 610, 710, and 810, Bluetooth communication circuits 620, 720, and 820, and speakers 630, 730, and 830, respectively. The speaker apparatus 600, 700, and 800 each have a function of receiving an audio signal via wireless communication based on the Bluetooth standard, but do not have a function of transmitting an audio signal. The speaker apparatus 600, 700, and 800 can each establish one-to-one communication to/from the main speaker apparatus 200 to receive an audio signal transmitted from the main speaker apparatus 200. The user selects any one of the speaker apparatus 600, 700, and 800 using the mobile phone 300 so that the main speaker apparatus 200 may establish communication to/from the selected one of the speaker apparatus 600, 700, and 800.

Figure 2:
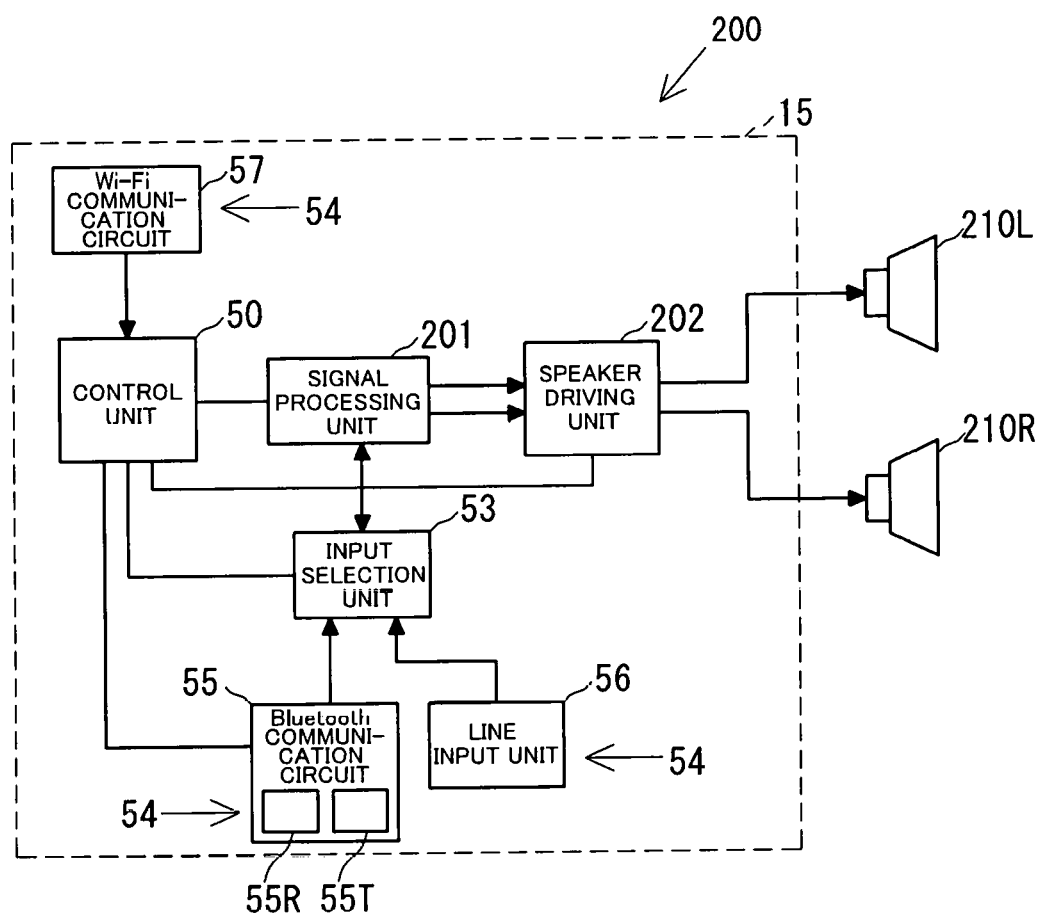
FIG. 2 is a block diagram of a main speaker apparatus.

FIG. 2 is a block diagram of the main speaker apparatus 200. The main speaker apparatus 200 includes the left and right speaker units 210L and 210R and the electronic circuit 15. The electronic circuit 15 includes a control unit 50, a signal processing unit 201, a speaker driving unit 202, an input selection unit 53, and a plurality of signal input units 54.

The signal input units 54 are each configured to receive an audio signal from an external input source device. In this embodiment, the signal input units 54 include the Bluetooth communication circuit 55, the LINE input unit 56, and the Wi-Fi communication circuit 57. The Wi-Fi communication circuit 57 corresponds to a first communication unit of the present invention.

The LINE input unit 56 includes a connector, for example, an audio mini jack, and an A/D conversion circuit. The terminal of an audio cable connected to an output terminal of the external input source device is plugged into the connector. The LINE input unit 56 is configured to convert an audio signal, which is input from outside via an audio cable, into a digital signal using the A/D conversion circuit, and then input this signal into the input selection unit 53. When the connector is a digital connector, for example, an optical fiber, the A/D conversion circuit is unnecessary.

The Bluetooth communication circuit 55 has functions of transmitting and receiving an audio signal via Bluetooth wireless communication. Specifically, the Bluetooth communication circuit 55 includes a transmission unit 55T and a reception unit 55R as its functions. The transmission unit 55T and the reception unit 55R of the Bluetooth communication circuit 55 can each be switched on/off, but both of those units cannot be switched on at the same time. The transmission unit 55T of the Bluetooth communication circuit 55 corresponds to a transmission unit of the present invention.

The Bluetooth communication circuit 55 (reception unit 55R thereof) and the LINE input unit 56 are connected to the input selection unit 53. The input selection unit 53 is configured to select any one of the Bluetooth communication circuit 55 and the LINE input unit 56 through a selection signal input from the control unit 50. Then, the input selection unit 53 outputs an audio signal, which is input from the selected Bluetooth communication circuit 55 or LINE input unit 56, to the signal processing unit 201.

The control unit 50 is formed of a microcomputer. The Wi-Fi communication circuit 57 is connected to the control unit 50. The Wi-Fi communication circuit 57 receives a command from the mobile phone 300 and inputs the command into the control unit 50. The control unit 50 cooperates with a control program to implement a setting unit 450 of the main speaker apparatus 200 (refer to FIG. 4). On the basis of a command input from the Wi-Fi communication circuit 57, the control unit 50 controls, for example, communication using the Wi-Fi communication circuit 57, switching of on/off of the reception unit 55R and the transmission unit 55T of the Bluetooth communication circuit 55, switching of the input selection unit 53, detection of a sink device that can connect to the main speaker apparatus 200 based on Bluetooth communication, and establishment of Bluetooth connection between the main speaker apparatus 200 and a selected sink device.

The signal processing unit 201 is configured to adjust a volume of the audio signal input from the input selection unit 53, and output the volume to the speaker driving unit 202 as an audio signal. The speaker driving unit 202 includes an amplifier, and is configured to amplify the audio signal input from the signal processing unit 201 and output the amplified signal to each of the speaker units 210L and 210R.

Figure 3:
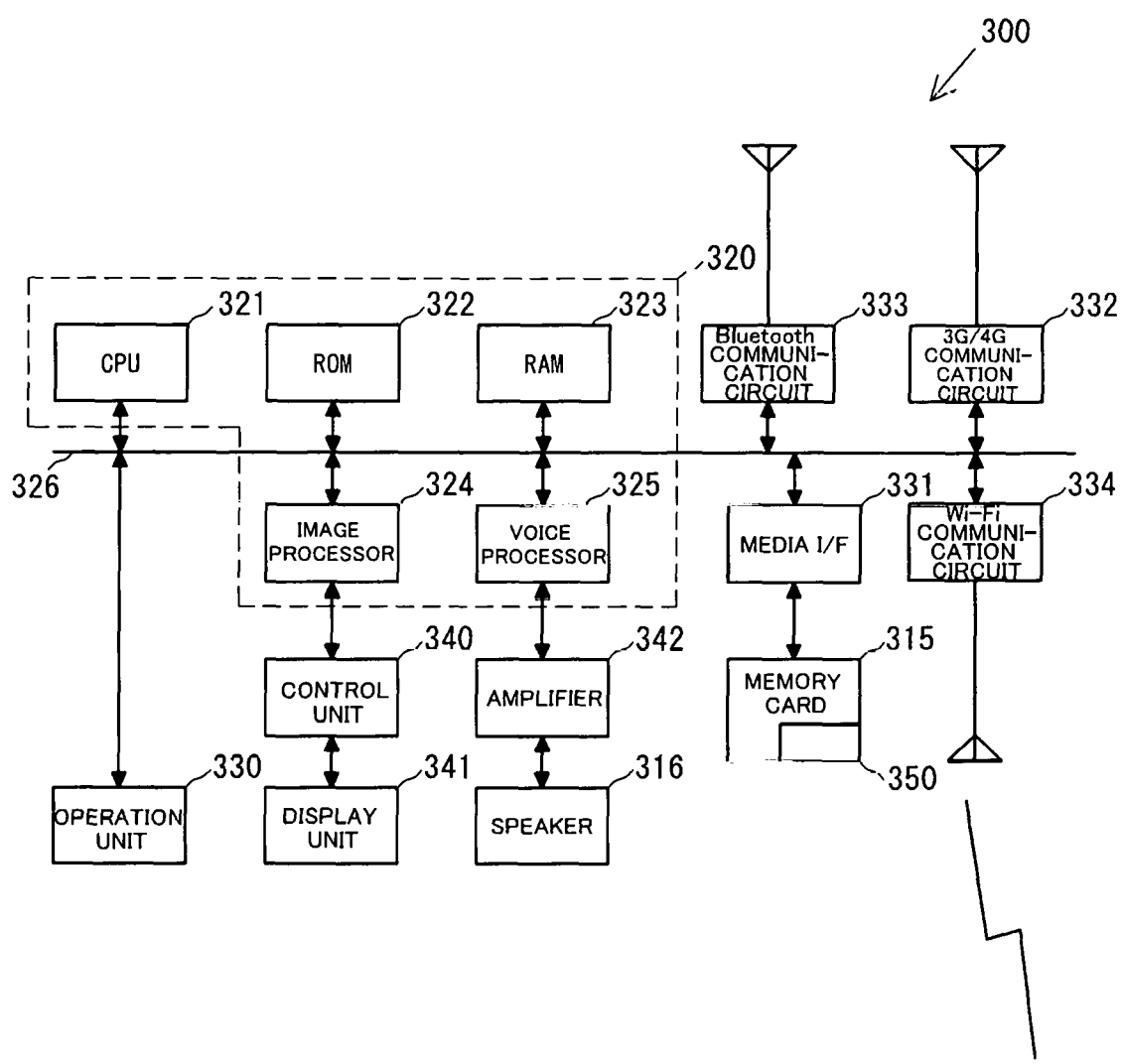
FIG. 3 is a block diagram of a mobile phone that functions as a control terminal of the main speaker apparatus.

FIG. 3 is a block diagram of the mobile phone 300 that functions as the control terminal of the main speaker apparatus 200. In this embodiment, a multifunctional mobile phone (smartphone) is used as the control terminal. However, the control terminal may be a device, for example, a tablet computer, as long as the device is a mobile terminal having a remote controller function.

The mobile phone 300 includes an audio device controller application program 350. When the audio device controller application program 350 is executed, the mobile phone 300 communicates to/from the main speaker apparatus 200 via Wi-Fi, and performs setting of the main speaker apparatus 200. The mobile phone 300, in which the audio device controller application program 350 is being executed, forms an audio device controller from the functional point of view.

As illustrated in FIG. 3, the mobile phone 300 includes, on a bus 326, a control unit 320, an operation unit 330, a media interface 331, a 3G/4G communication circuit 332, the Bluetooth communication circuit 333, and the Wi-Fi communication circuit 334. The control unit 320 includes a CPU 321, a ROM (flash memory) 322, a RAM 323, an image processor 324, and a voice processor 325. A video RAM (VRAM) 340 is connected to the image processor 324, and the display unit 341 is connected to the VRAM 340. The display unit 341 contains a liquid crystal display, and is configured to display, for example, a standby screen or a phone number. Further, the screen (refer to FIG. 5 and FIG. 6) of the audio device controller is also displayed on the display unit 341. An amplifier 342 including a D/A converter is connected to the voice processor 325, and a speaker 316 is connected to the amplifier 342.

Figure 5:
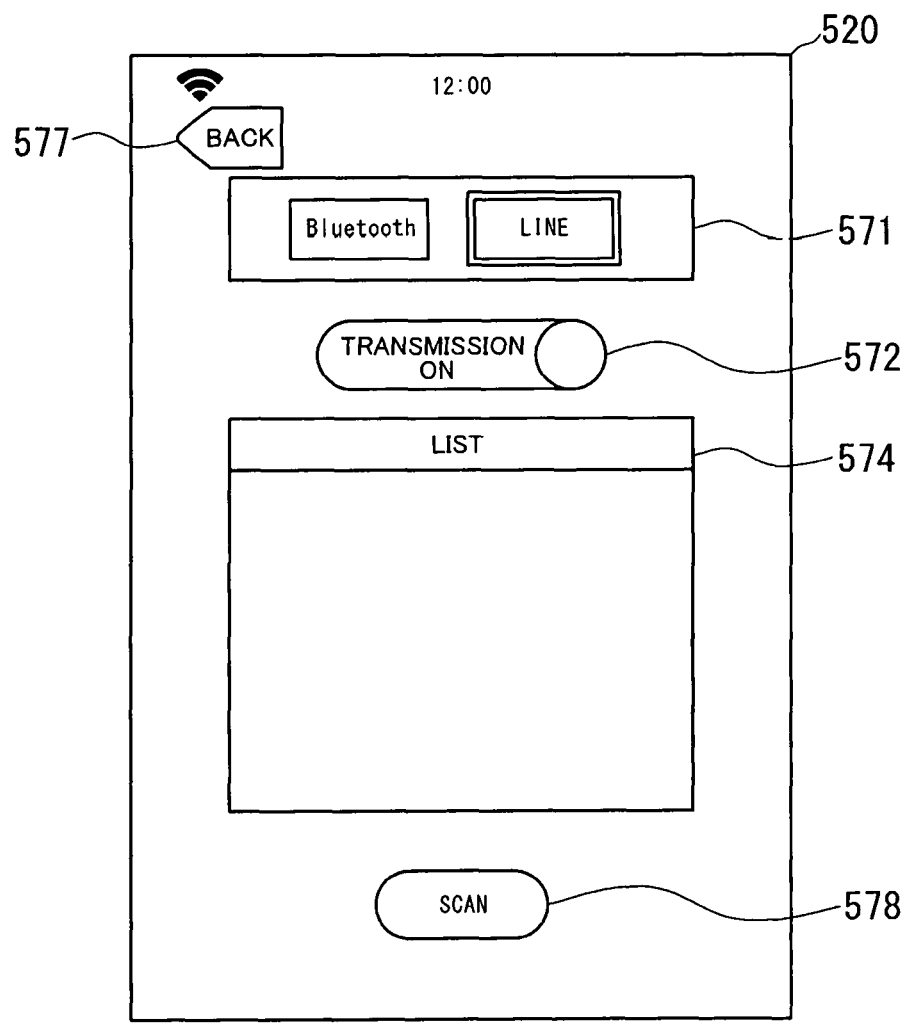
FIG. 5 is a diagram for illustrating a setting screen to be displayed on a display unit of the mobile phone that functions as the audio device controller.
Figure 6:
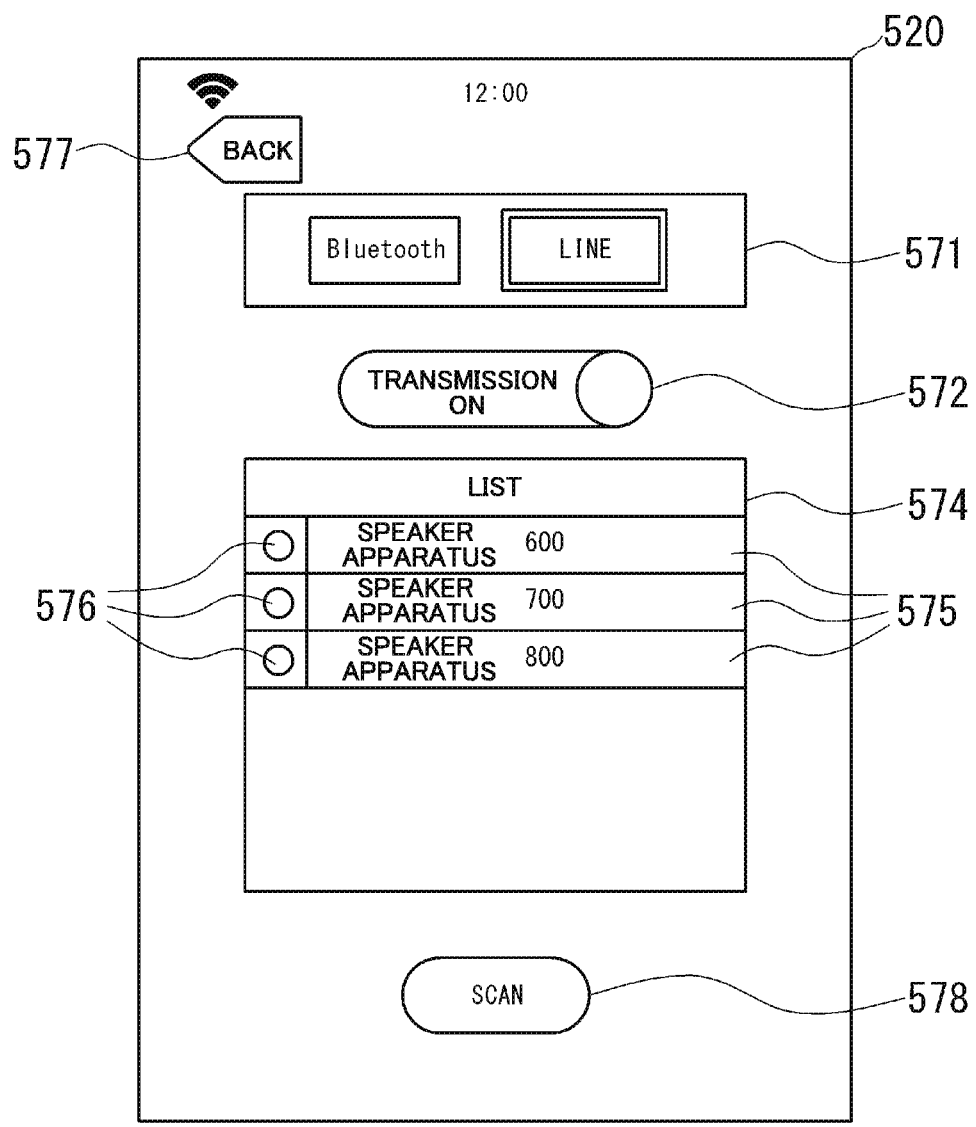
FIG. 6 is a diagram for illustrating a setting screen to be displayed on the display unit of the mobile phone that functions as the audio device controller.

The image processor 324 includes a graphics processing unit (GPU) configured to generate various kinds of images such as a standby screen or a phone number. When the audio device controller application program 350 is activated, the image processor 324 generates an image of the audio device controller as illustrated in FIG. 5 and FIG. 6 in accordance with an instruction from the CPU 321, and places the image on the VRAM 340. The image placed on the VRAM 340 is displayed on the display unit 341.

The voice processor 325 includes a digital signal processor (DSP) configured to encode/decode a telephone voice. The voice processor 325 outputs the decoded/generated voice to the amplifier 342. The amplifier 342 amplifies the voice signal for output to the speaker 316.

The ROM 322 or a memory card 315 stores an audio file (e.g., mp3) of music. The voice processor 325 reads, decodes, and reproduces this file. The amplifier 342 amplifies the reproduced music (audio signal) and the speaker 316 emits the sound of the music. In other cases, the sound can be transmitted to a communication partner device (e.g., main speaker apparatus 200) by the Bluetooth communication circuit 333.

The 3G/4G communication circuit 332 is configured to perform a voice call and data communication via a mobile phone communication network. An application program, for example, an audio device controller, is downloaded through data communication. Acquisition of an application program is not limited to downloading through 3G/4G communication, and may be performed via an interface such as Wi-Fi communication and USB.

The Bluetooth communication circuit 333 is configured to communicate to/from a (paired) device that is selected and set as a partner apparatus. For example, the Bluetooth communication circuit 333 transmits an audio signal of music stored in a memory of the mobile phone 300 to the audio device, for example, the main speaker apparatus 200.

The Wi-Fi communication circuit 334 is configured to communicate to/from the wireless access point 5 in a wireless manner based on the IEEE 802.11g standard. The Wi-Fi communication circuit 334 communicates to/from the main speaker apparatus 200 via the wireless access point. The mobile phone 300 functions as an audio device controller in cooperation with the audio device controller application program 350. Specifically, the mobile phone 300 communicates to/from the main speaker apparatus 200, and transmits a command signal relating to the setting of the main speaker apparatus 200.

The operation unit 330 contains a touch panel formed on the display unit 341, and is configured to detect a touch operation and a flick operation on the touch panel. The memory card 315 is connected to the media interface 331. The memory card 315 is, for example, a micro SD card. An application program is downloaded from a server by the 3G/4G communication circuit 332, and then stored into the memory card 315 or the ROM 322. In this mobile phone 300, the audio device controller application program 350 is stored in the memory card 315. The audio device controller application program 350 contains data necessary for execution of the program in addition to the program itself.

A basic program for executing a telephone call or an application program of the mobile phone 300 is stored in the ROM 322. Further, the ROM 322 is a flash memory, and can store downloaded application programs and other pieces of data in addition to the basic program. A work area to be used when the CPU 320 executes the audio device controller application program 350 is set in the RAM 323.

Figure 4:
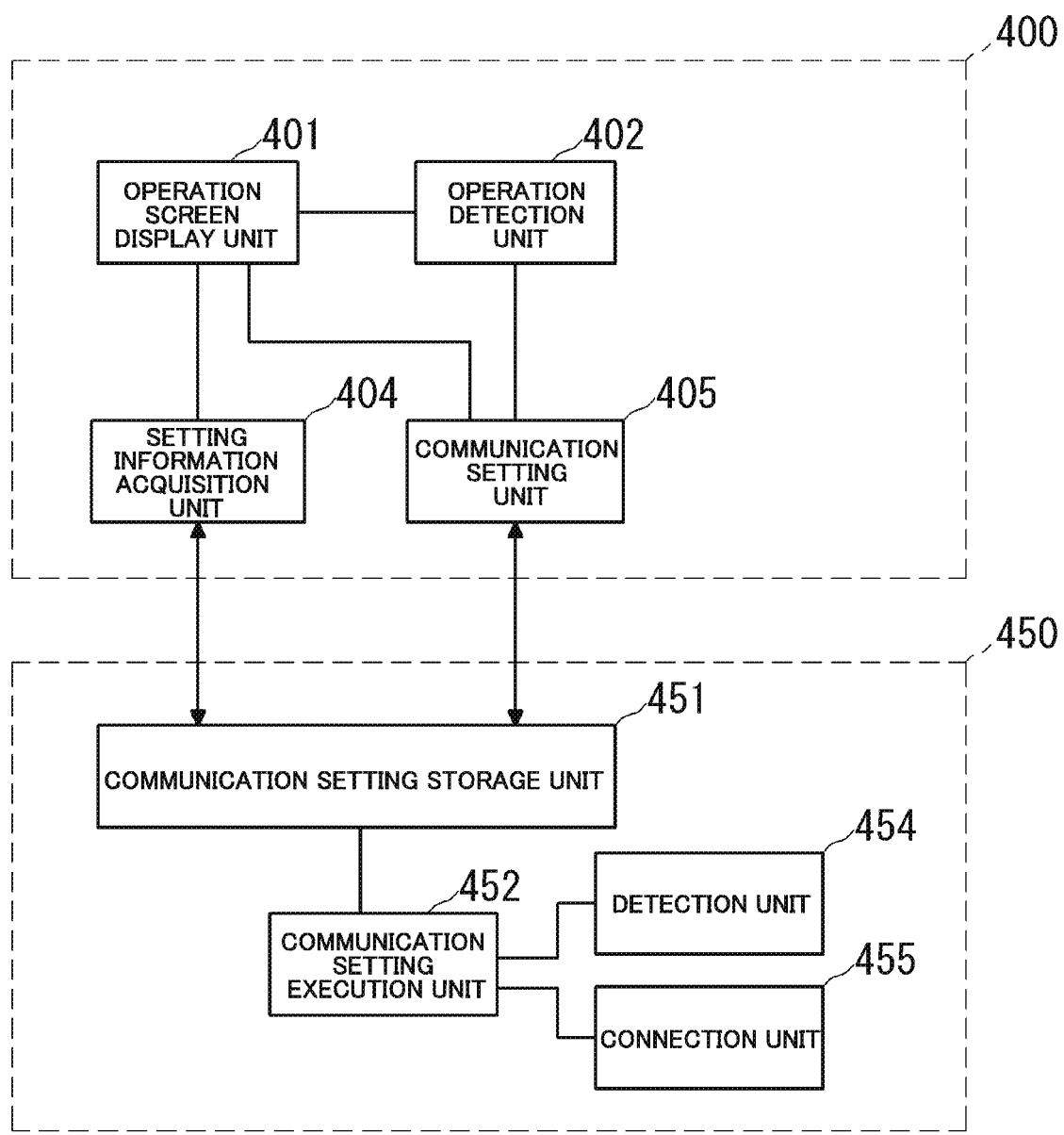
FIG. 4 is a functional block diagram of an audio device controller, which is implemented through cooperation between the mobile phone and an audio device application program, and a setting unit of the main speaker apparatus.

The mobile phone 300 forms an audio device controller 400 as illustrated in FIG. 4 in cooperation with the audio device controller application program 350 stored in the memory card 315, and transmits a command message to the main speaker apparatus 200 via Wi-Fi, to thereby control the main speaker apparatus 200.

FIG. 4 is a functional block diagram of the audio device controller 400, which is implemented through cooperation between the mobile phone 300 and the audio device application program 350, and the setting unit 450 of the main speaker apparatus 200. Now, a description is given of the audio device controller 400, which is implemented by the audio device controller application program 350 being read into the mobile phone 300 (hardware), and the setting unit 450 of the main speaker apparatus 200 with reference to FIG. 4.

The audio device controller 400 includes an operation screen display unit 401, an operation detection unit 402, a setting information acquisition unit 404, and a communication setting unit 405. The setting unit 450 of the main speaker apparatus 200 includes a communication setting storage unit 451, a communication setting execution unit 452, a detection unit 454, and a connection unit 455.

In the audio device controller 400, the operation screen display unit 401 is implemented through cooperation among the control unit 320, the VRAM 340, the display unit 341, and the audio device controller application program 350. The operation screen display unit 401 is configured to display various kinds of operation screens on the display unit 341 of the mobile phone 300.

The operation detection unit 402 is implemented through cooperation among the control unit 320, the operation unit 330, and the audio device controller application program 350. The operation detection unit 402 detects an operation (e.g., selection of sink device for communication to/from main speaker apparatus 200 via Bluetooth) performed by the user on an operation screen displayed on the display unit

341. The detected operation (operation information) of the user is input to the communication setting unit 405.

The communication setting unit 405 is implemented through cooperation among the control unit 320, the Wi-Fi communication circuit 334, and the audio device controller application program 350. The communication setting unit 405 is configured to organize operation information input from the operation detection unit 402 into a message, and transmit the message to the main speaker apparatus 200 (setting unit 450).

The setting information acquisition unit 404 is implemented through cooperation among the control unit 320, the Wi-Fi communication circuit 334, and the audio device controller application program 350. The setting information acquisition unit 404 inquires the main speaker apparatus 200 about setting information on currently set Bluetooth communication, and acquires current setting information on the main speaker apparatus 200 from the communication setting storage unit 451. The acquired setting information on Bluetooth communication is reflected in a setting screen 520 illustrated in FIG. 5 and FIG. 6 as setting information on Bluetooth communication.

The setting unit 450 of the main speaker apparatus 200 includes the communication setting storage unit 451, the communication setting execution unit 452, the detection unit 454, and the connection unit 455. Those function units are formed of the control unit 50 of the main speaker apparatus 200, necessary circuits, and programs.

The communication setting storage unit 451 stores, for example, setting information on Bluetooth communication such as on/off states of the reception function and the transmission function of the Bluetooth communication circuit 55 and another audio device capable of communicating to/from the main speaker apparatus 200 via Bluetooth, namely, a sink device that has paired with the main speaker apparatus 200. The communication setting storage unit 451 communicates to/from the communication setting unit 405 of the audio device controller 400, and stores setting information on Bluetooth communication received from the communication setting unit 405. Further, as described above, the communication setting storage unit 451 transmits stored setting information on Bluetooth communication in response to a request from the audio device controller 400.

The communication setting execution unit 452 is configured to execute content of the setting information on Bluetooth communication stored in the communication setting storage unit 451. The executed operation includes, for example, selection of the input unit 54 by the input selection unit 53, switching of on/off of the reception function and the transmission function of the Bluetooth communication circuit 55, selection of a sink device for communication to/from the main speaker apparatus 200 via Bluetooth, instruction of detection by the detection unit 454, and instruction of establishment of Bluetooth connection by the connection unit 455.

The detection unit 454 is configured to detect sink devices capable of receiving audio signals transmitted from the main speaker apparatus 200 via wireless communication based on the Bluetooth standard.

The connection unit 455 is configured to establish Bluetooth connection between a sink device specified through selection by the user among the sink devices detected by the detection unit 454 as being capable of performing Bluetooth communication and the main speaker apparatus 200.

FIG. 5 and FIG. 6 are diagrams for illustrating the setting screen 520 to be displayed on the display unit 341 of the mobile phone 300 that functions as the audio device controller 400. In the setting screen 520, an audio source selection button 571, an on/off switch button 572 for the transmission unit 55T of the Bluetooth communication circuit 55, a list display part 574, a back button 577, and a scan button 578 are displayed.

The audio source selection button 571 is an operator for selecting Bluetooth or LINE input as an input source (signal input unit with which the main speaker apparatus 200 receives an audio signal). Icons of Bluetooth and LINE input are displayed in the audio source selection button 571 as selectable input sources. When the user taps the icon of Bluetooth or LINE input, a command message for indicating a selection of an input source corresponding to the tapped icon is transmitted to the main speaker apparatus 200, and the tapped icon is displayed in such a manner that the icon is selected and active. In FIG. 5, LINE input is selected as the input source.

The on/off switch button 572 is an operator for switching on/off of the transmission unit 55T of the Bluetooth communication circuit 55. When the user moves a slider rightward, a command message to the effect that the transmission unit 55T of the Bluetooth communication circuit 55 needs to be set on is transmitted to the main speaker apparatus 200. When the user moves the slider leftward, a command message to the effect that the transmission unit 55T of the Bluetooth communication circuit 55 needs to be set off is transmitted to the main speaker apparatus 200.

When LINE input is selected as the input source and the transmission unit 55T of the Bluetooth communication circuit 55 is set on as illustrated in FIG. 5, an audio signal input through LINE input is transmitted to a sink device via Bluetooth.

The list display part 574 is displayed with the transmission unit 55T of the Bluetooth communication circuit 55 being set on by the on/off switch button 572. The list display part 574 displays information on sink devices that have paired with the main speaker apparatus 200.

The list display part 574 displays information on sink devices that is stored in the main speaker apparatus 200 when the setting screen 520 is displayed under a state in which the on/off switch button 572 is set on. In other words, when the main speaker apparatus 200 detected a sink device even once in the past, information on the sink device that was obtained through detection by the main speaker apparatus 200 is stored. Thus, the mobile phone 300 acquires the information for display on the list display part 574. When the main speaker apparatus 200 detected no sink device in the past, the mobile phone 300 considers that information on no sink device is stored, acquires the information (information on no sink device), and displays that information on the list display part 574. In FIG. 5, no sink device is stored in the main speaker apparatus 200 and thus the list display part 574 is blank. In FIG. 6, three sink devices are stored in the main speaker apparatus 200. In this manner, through display of the information stored in the main speaker apparatus 200 on the list display part 574, there is no longer a need to detect sink devices every time, and selection and switching of a sink device can be performed rapidly.

As illustrated in FIG. 6, information on sink devices that is displayed on the list display part 574 is, for example, the names of sink devices. Icons 575 with names of sink devices are displayed on the list display part 574. Check columns 576 for indicating connection states of Bluetooth communication are displayed on the side of the icons 575. When the user taps the icon 575 of any one of the audio devices, a command message to the effect that an audio device corresponding to the tapped icon 575 is selected is transmitted to the main speaker apparatus 200. When the connection of the Bluetooth communication with the selected sink device is completed and a reply indicating that the connection is completed is received, a cheek mark is added to the check box 576 corresponding to the tapped icon 575 in such a manner as to indicate the fact that Bluetooth connection is established.

When the back button 577 is tapped, the content set at that time (e.g., state of LINE input being selected as signal input unit 54, on/off state of Bluetooth transmission function, and the selected sink device) is stored, and the screen formed on the display unit 341 is returned to a top screen.

When the user taps the scan button 578, the mobile phone 300 transmits a command for detecting sink devices to the main speaker apparatus 200, and acquires information on the new sink devices.

FIG. 7 is a diagram for illustrating a procedure of displaying, on the list display part 574 of the mobile phone 300, sink devices (speaker apparatus 600, 700, and 800) capable of communicating to/from the main speaker apparatus 200 via Bluetooth.

When the mobile phone 300 displays the setting screen 520 on the display unit 341, that is, when the audio device controller 400 enters into a Bluetooth control mode of the main speaker apparatus 200 (Step S101), the mobile phone 300 transmits, to the main speaker apparatus 200, a command for confirming an on/off state of the transmission unit 55T of the Bluetooth communication circuit 55 (Step S102).

After the mobile phone 300 transmitted the command to the main speaker apparatus 200 (Step S102), the main speaker apparatus 200 returns a message for indicating the on/off state of the transmission unit 55T to the mobile phone 300 (Step S103).

The mobile phone 300, which has received a message for indicating the on/off state of the transmission unit 55T from the main speaker apparatus 200, determines whether or not the transmission unit 55T is in an on state or an off state based on the message (Step S104).

When it is determined that the transmission unit 55T is in the off state (Step S104), the mobile phone 300 displays the on/off switch button 572 of the setting screen 520 in such a manner as to indicate the off state (Step S105), and receives an operation by the user to switch the on/off switch button 572 from off to on. The mobile phone 300, which has received the user's operation, switches display of the on/off switch button 572 from off to on (Step S106), and transmits, to the main speaker apparatus 200, a command message to the effect that the transmission unit 55T is to be switched on (Step S107).

The main speaker apparatus 200, which has received the command from the mobile phone 300, switches the transmission unit 55T on (Step S108).

Then, the mobile phone 300 transmits, to the main speaker apparatus 200, a command for requesting information on sink devices that have paired with the main speaker apparatus 200 (Step S109).

After the mobile phone 300 transmits the command to the main speaker apparatus 200 (Step S109), the main speaker apparatus 200 returns to the mobile phone 300 information on sink devices that is stored in the communication setting storage unit 451 (Step S110). At this time, the main speaker apparatus 200 transmits information stored in the communication setting storage unit 451 to the mobile phone 300 irrespective of whether or not there is information on sink devices that is stored in the communication setting storage unit 451, that is, irrespective of whether or not there is information on one or more sink devices or no sink device.

The mobile phone 300, which has received information on sink devices from the main speaker apparatus 200, determines whether or not the received information contains information on one or more sink devices or information on no sink device (Step S111).

When it is determined that the received information on sink devices relates to no sink device, the mobile phone 300 transmits, to the main speaker apparatus 200, a command for requesting the main speaker apparatus 200 to detect sink devices capable of communicating to/from the main speaker apparatus 200 via Bluetooth (Step S112).

The main speaker apparatus 200, which has received the command from the mobile phone 300, tries to detect sink devices capable of communicating to/from the main speaker apparatus 200 via Bluetooth (Step S113). Now, it is assumed that, as a result of the main speaker apparatus 200 trying to detect sink devices, the speaker apparatus 600, 700, and 800 are detected. Information on the detected speaker apparatus 600, 700, and 800 is stored in the communication setting storage unit 451.

After the detection by the main speaker apparatus 200 ends, the mobile phone 300 transmits, to the main speaker apparatus 200, a command for requesting information on sink devices that have paired with the main speaker apparatus 200 (Step S114).

After the mobile phone 300 transmits the command to the main speaker apparatus 200 (Step S114), the main speaker apparatus 200 returns to the mobile phone 300 information on paired sink devices that is stored in the communication setting storage unit 451 (Step S115).

The mobile phone 300, which has received the information on sink devices from the main speaker apparatus 200, displays the list display part 574 on the setting screen 520 of the display unit 341 based on the received information on sink devices (Step S116).

When the received information on sink devices relates to one or more sink devices, the icons 575 with the names of audio devices are displayed on the list display part 574. In FIG. 6, the speaker apparatus 600, 700, and 800 are displayed. Further, when the received information on sink devices relates to no sink device, the icons 575 with the names of audio devices are not displayed on the list display part 574, and the list display part 574 is displayed in blank (refer to FIG. 5).

On the contrary, when it is determined that the transmission unit 55T is in the on state (Step S104), the mobile phone 300 does not execute the processing of from Step S105 to Step S113, but executes the processing of S114 onward. Specifically, when it is determined that the transmission unit 55T is in the on state (Step S104), the mobile phone 300 does not transmit a command for detecting sink devices to the main speaker apparatus 200, but transmits a command for requesting information on sink devices capable of communicating to/from the main speaker apparatus 200 via Bluetooth (Step S114). After the mobile phone 300 transmits the command to the main speaker apparatus 200 (Step S114), the main speaker apparatus 200 returns to the mobile phone 300 information on sink devices that is stored in the communication setting storage unit 451 at the current time (Step S115). When the mobile phone 300 receives the information on sink devices from the main speaker apparatus 200, the mobile phone 300 displays the list display part 574 on the setting screen 520 of the display unit 341 based on the received information on sink devices (Step S116).

Further, when it is determined that the information on sink devices relates to one or more sink devices (Step S111), the mobile phone 300 does not execute the processing of from Step S112 to Step S115, but executes the processing of S116. Specifically, when it is determined that the information on sink devices relates to one or more sink devices (Step S111), the mobile phone 300 does not transmit a command for detecting sink devices and a command for requesting information on sink devices to the main speaker apparatus 200, and displays the list display part 574 on the setting screen 520 of the display unit 341 based on the information on sink devices that is already received in Step S110 (Step S116).

In this embodiment, detection of sink devices is not executed every time the setting screen 520 is displayed on the mobile phone 300, and thus sink devices are displayed on the list display part 574 without consumption of the detection time. Therefore, it is possible to rapidly select or switch a sink device.

In this embodiment, a list of sink devices is displayed on the setting screen 520 of the mobile phone 300. Thus, it is possible to set pairing for an audio device without a display unit (display) using the mobile phone 300 with the display unit 341 (display).

The setting screen 520 has the scan button 578, and when the user taps the scan button 578, the mobile phone 300 can transmit a scan command to the main speaker apparatus 200 to acquire a list of new sink devices in every step of the processing of FIG. 7.

In this embodiment, the main speaker apparatus 200 including the speaker 210 is illustrated as an audio device, but the audio device of the present invention is not limited thereto. It suffices that a plurality of audio sources including Bluetooth are selectable in the audio device. Further, the selectable audio sources are not limited to Bluetooth and LINE input. The audio device may also have a tuner or a media player function.

The list display part 574 of this embodiment displays sink devices that have paired with the main speaker apparatus 200, but may display audio devices that have not paired with the main speaker apparatus 200.

The wireless communication means may be communication means other than Bluetooth, and a plurality of communication means may be employed in a mixed manner.

In this embodiment, one-to-one communication, namely, the configuration in which only one speaker apparatus can be selected in FIG. 6 is employed, but one-to-many communication, namely, the configuration in which a plurality of speaker apparatus can be selected in FIG. 6 may be employed.

According to one embodiment of the present invention, there is provided a method including: acquiring sink device related information, which is information on sink device capable of receiving a signal transmitted from a transmission unit of a main apparatus in response to an operation of switching the transmission unit on, the sink device related information being acquired before the operation of switching the transmission unit on; determining whether or not the sink device related information contains information on sink device; displaying, when it is determined that the sink device related information contains information on sink devices, the information on sink device on a display unit based on the sink device related information; and causing, when it is determined that the sink device related information does not contain information on sink device, the main apparatus to try to detect sink device and causing the display unit to display information on sink device based on a result of the detection.

According to a first embodiment of the present invention, there is provided a control terminal, which is configured to communicate to/from and control an audio device, the audio device including: a transmission unit configured to transmit an audio signal via wireless communication and capable of being switched on/off; a detection unit configured to detect sink device, which is another audio device capable of receiving an audio signal transmitted from the transmission unit; and a storage unit configured to store information on sink device that is acquired by the detection unit, the control terminal including: a display unit configured to display an operation screen configured to receive an operation of switching the transmission unit on/off and the information on sink device as a list; an operation unit configured to receive an operation of switching the transmission unit on/off and an operation of selecting the sink device; and a control unit configured to control the display unit and the operation unit, in which the control unit is configured to: inquire the audio device about an on/off state of the transmission unit when starting to display the operation screen on the display unit; request, when the transmission unit is on, the audio device to transmit the information on sink device; display the information on sink device received from the audio device as a list; transmit, when the control unit has received an operation of switching the transmission unit on during display of the operation screen, a command for switching the transmission unit on to the audio device and request the audio device to transmit the information on sink device; display, when the information on sink device received from the audio device contains information on sink device, the sink device as a list; and transmit, when the information on sink device does not contain information on sink device, a command for detecting sink device to the audio device, and cause the detection unit of the audio device to try to detect sink device, to thereby acquire the information on sink device, which is a result of the detection, from the audio device.

According to a second embodiment of the present invention, there is provided an audio system including: the control terminal according to the first embodiment of the present invention; and an audio device, the audio device including: a first communication unit configured to communicate to/from the control terminal; a transmission unit configured to transmit an audio signal via wireless communication and capable of being switched on/off; a detection unit configured to detect sink device, which is another audio device capable of receiving an audio signal transmitted from the transmission unit; a storage unit configured to store information on sink device detected by the detection unit; and a control unit configured to control operations of the first communication unit, the transmission unit, and the detection unit, in which the control unit is configured to: switch, when the transmission unit is off and the control unit has received a command for switching the transmission unit on from the control terminal, the transmission unit on and transmit the information on sink device stored in the storage unit to the control terminal; transmit, when the transmission unit is on and the control unit has received a command for requesting a list of sink device from the terminal apparatus, the information on sink device stored in the storage unit to the control terminal; and cause, when the control unit has received a command for specifying sink device from the control terminal, the transmission unit to transmit the audio signal to the specified sink device.

In the embodiments of the invention described above, the audio device may be free from a display configured to display a list of the sink device, and the control terminal may include a display configured to display a list of the sink device.

According to a third embodiment of the present invention, there is provided an audio device control program for causing a computer of a control terminal to function as first means and second means, the control terminal including: a display unit configured to display an operation screen configured to receive an operation of switching the transmission unit on/off and information on sink device as a list; an operation unit configured to receive an operation of switching the transmission unit on/off and an operation of selecting the sink device; and a control unit configured to control the display unit and the operation unit, the control terminal being configured to communicate to/from and control an audio device including: a transmission unit configured to transmit an audio signal via wireless communication and capable of being switched on/off; a detection unit configured to detect sink device, which is another audio device capable of receiving an audio signal transmitted from the transmission unit; and a storage unit configured to store information on sink device detected by the detection unit, the first means being configured to: inquire the audio device about an on/off state of the transmission unit when starting to display the operation screen configured to receive an operation of switching the transmission unit on/off on the display unit; request, when the transmission unit is on, the audio device to transmit the information on sink device; and display the information on sink device received from the audio device as a list, the second means being configured to: transmit, when the control unit has received an operation of switching the transmission unit on during display of the operation screen, a command message for switching the transmission unit on to the audio device and request the audio device to transmit information on sink device; display, when the information on sink device received from the audio device contains information on sink device, the sink device as a list; and transmit, when the information on sink device received from the audio device does not contain information on sink device, a command message for detecting sink device to the audio device, and cause the detection unit of the audio device to try to detect sink device, to thereby acquire the information on sink device, which is a result of the detection, from the audio device.

The sink device related information acquisition unit, and the first and second display control units as specified in the appended claims may be included in, for example, the main speaker apparatus 200 or the mobile phone 300. Further, the main apparatus as specified in the appended claims corresponds to, for example, the main speaker apparatus 200.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A system for controlling speaker apparatus comprising: a main speaker apparatus having a plurality of communication circuits; a controller configured to wirelessly connect with the main speaker apparatus by a first connection method; and one or more secondary speaker apparatus configured to wirelessly connect with the main speaker apparatus by a second connection method, wherein the first connection method is different from the second connection method, the main speaker apparatus includes a storage unit configured to store speaker apparatus information relating to the one or more secondary speaker apparatus to which the main speaker apparatus transmits a signal by the second connection method, the controller has a display unit and an acquisition unit configured to acquire the speaker apparatus information from the main speaker apparatus by the first connection method when the controller commands the main speaker apparatus to turn on a communication circuit for the second connection method in response to a user input, the controller determines if a received speaker apparatus information includes the information representing the one or more secondary speaker apparatus, and if the speaker apparatus information includes the information representing the one or more secondary speaker apparatus, the display unit displays information representing the one or more secondary speaker apparatus based on the speaker apparatus information stored in the storage unit, if the speaker apparatus information does not include the information representing the one or more secondary speaker apparatus, the controller causes the main speaker apparatus to search for the one or more secondary speaker apparatus, and the display unit displays the information representing the one or more secondary speaker apparatus based on the search.

2. The system according to claim 1,
wherein the one or more secondary speaker apparatus is configured to receive by the second connection method the signal from the main speaker apparatus, and output an audio signal based on the received signal.

3. The system according to claim 2,
wherein the one or more secondary speaker apparatus includes a plurality of speaker apparatus, and
wherein at least one of the plurality of communication circuits of the main speaker apparatus is configured to transmit the signal by the second connection method in response to an instruction from the controller an audio signal to a selected one of the plurality of speaker apparatus.

4. The system according to claim 1,
wherein the one or more secondary speaker apparatus includes a plurality of speaker apparatus,
wherein the main speaker apparatus includes
a first communication circuit configured to communicate with the controller by the first connection method;
a second communication circuit configured to communicate with the one or more secondary speaker apparatus by a second connection method; and
a control unit configured to control operation of the first communication circuit, the second communication circuit, and
wherein the control unit is configured to
when the control unit receives a command for requesting the speaker apparatus information from the controller while the second communication circuit is turned on, transmit the speaker apparatus information stored in the storage unit to the controller, and
when the control unit has received from the controller a selection of one of the plurality of speaker apparatus, cause the second communication circuit to transmit the audio signal to the selected speaker apparatus by the second communication method.

5. A controller for controlling an audio device comprising: a processor; a communication circuit configured to wirelessly connect with a main speaker apparatus by a first connection method; a display unit; an acquisition unit configured to acquire speaker apparatus information relating to one or more secondary speaker apparatus configured to receive from the main speaker apparatus signals by a second connection method; and a memory configured to store a plurality of programmed instructions; wherein the first connection method is different from the second connection method, and the programmed instructions include instructions configured to cause the processor to acquire the speaker apparatus information from the main speaker apparatus by the first connection method when the controller commands the main speaker apparatus to turn on a communication circuit for the second connection method in response to a user operation, determine if a received speaker apparatus information includes the information representing the one or more secondary speaker apparatus, display information representing the one or more secondary speaker apparatus based on the speaker apparatus information received from the main speaker apparatus when the speaker apparatus information includes the information representing the one or more secondary speaker apparatus, and cause the main speaker apparatus to perform a search of the one or more secondary speaker apparatus when the speaker apparatus information does not include any information representing the one or more secondary speaker apparatus, and display the information representing the one or more secondary speaker apparatus based on the search.

6. The controller according to claim 5,
wherein the speaker apparatus is configured to receive by the second connection method the signal from the main speaker apparatus, and output an audio signal based on the received signal.

7. The controller according to claim 6,
wherein the speaker apparatus includes a plurality of speaker apparatus, and
wherein at least one of the plurality of communication circuits of the main speaker apparatus is configured to transmit the signal by the second connection method in response to an instruction from the controller an audio signal to a selected one of the plurality of speaker apparatus.

* * * * *